United States Patent [19]

Raney et al.

[11] Patent Number: 5,179,383
[45] Date of Patent: Jan. 12, 1993

[54] SYNTHETIC APERTURE RADAR PROCESSOR TO HANDLE LARGE SQUINT WITH HIGH PHASE AND GEOMETRIC ACCURACY

[76] Inventors: R. K. Raney, 1210-1435 Prince of Wales Drive, Ottowa, Ontario, Canada, K2C 1N5; Ian G. Cumming, 4340 Colchester Dr, Richmond, BC, Canada, V7C 4R4; Frank H. Wong, 8591 Osgoode Place, Richmond, B.C., Canada, A7A 4M4

[21] Appl. No.: 729,641

[22] Filed: Jul. 15, 1991

[51] Int. Cl.$^5$ .............................................. G01S 13/90
[52] U.S. Cl. ....................................................... 342/25
[58] Field of Search ......................................... 342/25

[56] References Cited

U.S. PATENT DOCUMENTS

| | | | |
|---|---|---|---|
| 4,771,287 | 9/1988 | Mims | 342/25 |
| 4,985,704 | 1/1991 | Smith | 342/25 |
| 5,043,734 | 8/1991 | Niho | 342/25 |

Primary Examiner—Gilberto Barron, Jr.
Attorney, Agent, or Firm—Christie, Parker & Hale

[57] ABSTRACT

A digital signal processor for synthetic aperture radar (SAR) data comprising a method of implementing range cell migration correction without the use of an interpolator, and a method of applying phase corrections and memory management to accommodate large squint in the radar sensor. With this method, the image quality of the processed SAR image is improved, particularly in regard to phase and geometric registration.

12 Claims, 7 Drawing Sheets

(a) TARGET TRAJECTORY AND ENVELOPE (b) FREQUENCY/TIME CHARACTERISTICS

SYNTHETIC APERTURE RADAR PROCESSOR TO HANDLE LARGE SQUINT WITH HIGH PHASE AND GEOMETRIC ACCURACY

FIELD OF THE INVENTION

The present invention relates to a digital synthetic aperture radar (SAR) processor for producing high-fidelity images from data collected by airborne or spaceborne SAR sensors.

The procesor maintains high phase and registration accuracy even in cases in which:
a) the SAR antenna is squinted away from the broadside direction,
b) the real antenna beamwidth is large, and
c) when a wide range swath is to be imaged.

The technique is applicable to any imaging system for which the two-dimensional signal format has spherical wavefront properties analogous to that of a SAR.

BACKGROUND OF THE INVENTION

An imaging radar is a microwave sensor used to make two-dimensional images of surfaces or objects, where the resulting image is a map of the microwave reflectivity of the surface or object. In civilian or remote sensing applications, the surfaces are typically the surface of the earth, with known applications extending to celestial objects such as the moon or the planet Venus. In military applications, the sensed object is often an object of tactical or strategic significance.

Imaging radars are usually installed on moving platforms, such as aircraft or satellites. In such cases, the motion of the sensor platform provides one of the imaged dimensions, although known motion of the sensed surface or object can be accommodated in the processing. The second dimension is provided by the flight time of the microwave energy, which is proportional to the range between the sensor and the object or surface reflecting the radar energy (this second dimension cannot be coincident with the sensor/object motion dimension). In other SAR cases, it is possible for the sensor to be stationary, with the motion of the imaged object providing the motion dimension.

In simple imaging radars, the resolution in the motion dimension is given by the width of the radar beam in the motion direction. Such radars are referred to as RARs, for real aperture radars. However, the resolution of such imaging radars is often too coarse in the motion dimension to be useful in certain applications.

In June 1951, Dr. Carl Wiley of the Goodyear Aerospace Corporation introduced the concept of synthetic aperture radar or SAR, in which fine resolution in the motion dimension was obtained by processing the Doppler frequency of the reflected radar signal. In the side-looking case, the motion dimension is always perpendicular to the range or pulse time dimension, although these two dimensions do not always lie upon the surface being imaged. A good exposition of the principles of SAR are given in the book by Harger (1970).

Up until approximately 1975, an image was usually made from the received SAR data using a coherent optical system based on the principles of Fourier optics. In such optical SAR processors, lenses illuminated by coherent wavefronts (from laser sources) can perform mathematical operations such as two-dimensional Fourier transforms needed to focus the data into SAR images. (Raney, 1982)

In the 1970's, digital computer technology had advanced to the point where SAR images could be made using digital signal processing techniques. Although the initial digital SAR processors were slow in comparison to the optical processors, it was soon recognized that better control over the processing parameters and equations could be exercised in digital processors, and that better quality images could be produced A comparison of optical and digital processing technologies and capabilities was given by Ausherman in 1977, at the time when the advantages of digital processing were becoming apparent to knowledgeable engineers in the field. Engineers at MacDonald Dettwiler and CCRS were some of the more sophisticated proponents of digital SAR processing; for example, see the papers by Bennett and Cumming in 1979.

The principles of synthetic aperture radar, and its digital processing can be stated as follows. A moving platform, such as an aircraft or satellite, carries a radar system which emits encoded pulses of microwave radiation at periodic intervals called the pulse repetition interval or PRI. The inverse of the PRI is called the pulse repetition frequency or PRF. For each transmitted pulse, the radar system receives the echo from certain objects or surfaces within the illumination boundaries of the radar beam. The received signal is demodulated in a coherent fashion so that the phase of the demodulated signal is an accurate representation of the instantaneous range between the radar and the reflecting object at the time of the emitted pulse. This demodulated signal is digitized and recorded in computer memory or on magnetic tape or disk, and is subsequently passed to the digital signal processor to focus the received information into radar images.

The platform is assumed to be travelling at constant speed in a straight line, or along a predictable curved path. (For most SAR systems, the receiver uses the same SAR antenna as the transmitter. This is referred to as a monostatic SAR. In some cases, the receiver is on a separate platform, or on the ground. This latter form of SAR is referred to as bistatic SAR.) If this is not the case, a motion compensation system is used to change the time of the transmitted signal and the phase and time delay of the received signal, to emulate the signal that would be received from a stable platform.

The PRF is high compared to the speed of the platform and the width of the beam, such that a given radar reflector is illuminated by many pulses while the platform travels past the reflector. The distance travelled by the platform during this reflector illumination period is referred to as the synthetic aperture. This distance is much longer than the antenna length in the motion direction or the physical antenna aperture.

The received SAR signal is in the form of a one-dimensional hologram in the along-track direction, and contains radar induced coding and reflector induced delay in the range direction. In its raw or received form, the SAR data is completely unfocused, as information essential to signal focussing or image formation is contained in the phase rather than the amplitude of the received data. The SAR processor uses a geometry model to deduce the phase that is created by each reflector in the illuminated area, and uses this phase information to derive the structure and values of an electronic matched filter which will unscramble or compress the received data. The length of the matched filter is the length of the synthetic aperture, and when the data is compressed, it has the approximate resolution that would be obtained from a conventional RAR with a physical antenna the length of the synthetic aperture.

More specifically, the geometry model is used to determine the precise range between the radar antenna and the reflector at each radar pulse that the reflector is illuminated. This sequence of range values is expressed in a so-called range equation, from which most of the digital processing parameters are derived.

In its simplest form, the digital SAR processor uses interpolators and convolution operators to apply the matched filter to the received data, in order to focus the data into an image. This is a very numerically-intensive operation, with approximately 3000 million adds or multiplies needed per second to generate an image from a typical satellite SAR in real time.

There are two main aspects of SAR data which complicate the processing operations. The first is that the data received from a given reflector is not orthogonal to the range or azimuth axes or coordinates when stored in computer memory. The computer's memory can be thought of as a rectangular grid, with one side (the rows) parallel to the radar beam or range direction, and the other side (the columns) parallel to the platform's motion direction (called the azimuth direction). Stated in another fashion, when the echo from each radar pulse is received and stored in computer memory as a range line (a row of range cells), the range cell number corresponding to the start time of a given reflector varies with pulse number or azimuth time.

In SAR terminology, this variation of range cell number of each received echo is referred to as range cell migration. In the processing algorithm this migration must be corrected in one or more of the processing steps, an operation referred to as range cell migration correction, or RCMC. In most processing algorithms, this migration is corrected prior to the application of the azimuth matched filter, but it can be combined with the azimuth compression operation. Unless RCMC is done accurately, the resolution, phase and registration of the image will suffer.

The second complicating factor is that the parameters of the azimuth matched filter, as well as those of the range cell migration correction operation vary with range and possibly also with azimuth. This non-stationarity means that simple matched filtering techniques cannot be used. Unless special provision is made for these non-stationarities, an accurately focused image will not result.

If the SAR antenna is pointed in a direction perpendicular to the direction of motion of the platform (relative to the imaged surface), the SAR is said to be operating in a broadside or zero-squint mode. If the antenna is pointed forward or backward with respect to this broadside direction, the SAR is said to be operating in a squinted mode. The squint angle is the angle between the beam centerline and the broadside direction, measured in the plane containing the beam centerline and the platform relative motion vector. This broadside direction is the direction to the zero-Doppler line, which is the locus of points on the surface of the imaged terrain where the azimuth Doppler frequency of the received signal is zero.

The success of the SAR processing operation depends upon the efficiency of the operations, and on the image quality of the focused image. Depending upon the requirements of the user, one or the other of these processing attributes will be dominant. As computers get faster, the tendency has been to concentrate more on image quality, which has been a driving factor in the subject invention.

In the early days of SAR processing, the image quality requirements were relatively simple, with the focusing of the detected image, or the achieved resolution, being the primary concern. However, as SAR processing technology advanced and users became more demanding, the requirements of SAR image quality have become more sophisticated. Current image quality measures now include:

1. range resolution,
2. azimuth resolution,
3. peak side lobes,
4. integrated side lobes,
5. contrast ratio,
6. absolute registration accuracy,
7. relative registration accuracy,
8. absolute radiometric accuracy,
9. relative radiometric accuracy, and
10. target phase.

Particular attention is drawn to the image quality attribute of target phase. Until very recently, most SAR processors produced detected images, in which the information of the target phase was removed. However, with recent applications of SAR such as polarimetry and interferometry being developed in which the phase information is specifically used, the phase fidelity of the processed image is becoming important.

In general, phase is the most difficult of the image quality parameters to measure, and is the parameter which is most sensitive to processing errors. In particular, when the squint of the SAR beam exceeds a few degrees, the processing becomes more complicated, and it is more difficult to produce an image with accurate phase. In the subject invention, a SAR processing algorithm is developed which preserves image phase more accurately in the presence of moderate or large squint angles than previous algorithms.

The most straight-forward way of compressing SAR data is to use a time-domain convolution to match filter the data in the range and azimuth directions. In the range direction, the range matched filter compresses the encoded radar pulse or chirp, while in the azimuth direction, the azimuth matched filter compresses the synthetic aperture described above. The range and azimuth compression operations are usually done separately, although they can be combined into a single two-dimensional convolution operation. If range cell migration correction (RCMC) is needed, it is applied with a range-direction interpolator in the time-domain processor.

While virtually all radars use encoded or expanded pulses today, the range compression operation is sometimes done with an analogue device before the data enters the digital SAR processor. In this manuscript, it is assumed that the SAR data is to be range compressed in the digital SAR processor, as is commonly done in satellite SAR systems.

The time-domain processor is the most simple processor, and can be very accurate, as long as the matched filters and interpolator coefficients are defined with sufficient precision. However, it is very inefficient in terms of computer operations when the pulse lengths or the synthetic apertures are long, or when RCMC is needed. The synthetic apertures are long when an aircraft SAR is operated at long ranges or with long wavelengths, and are very long for virtually all satellite SARs.

To overcome the disadvantages of inefficiency of the time-domain algorithm, frequency-domain SAR processing algorithms were developed in the late 1970's. The algorithm which has gained the widest use is the so-called Range/Doppler algorithm, in which azimuth compression, and particularly RCMC, is performed in the range-image, Doppler-frequency domain. This algorithm became popular because of its high efficiency, its relatively simple implementation and its ability to accommodate a very general form of range equation in its RCMC and azimuth compression operations.

The range/Doppler algorithm was first conceived by C. Wu and colleagues at the Jet Propulsion Lab in 1976 (Wu, 1976 and 1982). Fundamental improvements were made to the algorithm by MacDonald Dettwiler personnel in 1977–79, most notably the incorporation of an interpolator in RCMC to reduce the paired-echo artifact (Cumming & Bennett, 1979). This algorithm was steadily improved during the 1980's, and MacDonald Dettwiler delivered approximately 15 range/Doppler SAR processors to customers around the world during this period. Improvements continue to be made to this popular algorithm; e.g., Smith developed a frequency-domain expansion of the range equation which allows processing parameters to vary across azimuth blocks in a seamless fashion (Smith, 1991).

One disadvantage of the range/Doppler algorithm is that its efficiency drops when an attempt is made to achieve the highest accuracy by updating the azimuth processing parameters every range cell. Another disadvantage is that the interpolator used to implement RCMC is the hardest part of the algorithm to implement, and is one of the largest sources of error in the algorithm.

To overcome these disadvantages, a number of scientists have been exploring the wave equation approach to SAR processing, using analysis and processing principles originally developed in the field of seismic signal processing. The seismic algorithms were developed by many people in the 1960's and 1970's, with notable work done by Stolt who introduced a change of variables which allowed the processing parameters to vary continuously with range (Stolt 1978).

Professor Rocca and his colleagues in Milano, Italy were the first to recognize the applicability of the seismic techniques to SAR processing. They introduced a compromise allowed by the relative scales of the SAR wavelength and geometry which led to a version of the wave equation algorithm which, although an approximation, eliminated the interpolation operation (Cafforio et al., 1988, 1991). While a significant advance in concepts, Rocca's algorithm proved to be no more efficient or accurate than the range/Doppler algorithm (Scheuer & Wong, 1991). In fact, in many cases it was less accurate, because his algorithm assumes that RCMC does not vary with range Another wave equation algorithm development was made by Raney and Vachon (1989). By reintroducing the interpolator, they obtained another form of the wave equation algorithm which could handle large amounts of squint.

There is a significant common feature to be found among all wave domain algorithms described in the literature: they all assume that the range signal has already been focused, or, equivalently, that the unfocused range signal has no importance to wave domain processing steps. The new invention takes a radically different approach in this regard, as will be discussed below.

The wave equation approach is distinguished by the fact that many of the SAR processing steps (especially RCMC) are done in the two-dimensional frequency domain. This is fundamental to the wave equation formulation, which handles the SAR processing exactly for a particular form of SAR geometry which we will refer to as rectilinear geometry. Rectilinear geometry refers to the case where the range equation is exactly given by a hyperbola, with the curvature of the hyperbola proportional to $1/R_0$, where $R_0$ is the range between the radar antenna and the reflector at the closest point of approach.

Rectilinear geometry applies to the case where the sensor is travelling in a straight line and the reflector is stationary. This is the case for many airborne SARs, but is an approximation for satellite SARs. The approximation is good enough to provide adequate focussing of most satellite SAR data, but is not good enough to provide accurate registration and phase in the focused image.

To summarize the current level of technology, both the range/Doppler and wave equation algorithms can produce well focused images in most cases, but a few disadvantages persist. The advantages of the range/Doppler algorithm are:
1. Good implementation efficiency,
2. General form of range equation accommodated,
3. Large Doppler offset changes easily handled.

The disadvantages of the range/Doppler algorithm are:
1. Uses an interpolator,
2. Only limited squint handled accurately.

The advantages of the wave equation algorithms are:
1. Accurate RCMC & azimuth compression for rectilinear geometry,
2. Good focus is maintained over higher degrees of squint.

The disadvantages of the wave equation algorithms are:
1. Only an approximation for non-rectilinear geometries,
2. Difficulty in handling large changes in Doppler offset with range,
3. Uses an interpolator in most versions.

It is seen from this list that the two algorithms are largely complementary. In other words, where one algorithm has a shortcoming, the other algorithm excels, and vice versa. The concept of the new invention, to be described below, is to introduce some new algorithm steps which allow the best features of these two algorithms to be combined, and at the same time eliminate most of their disadvantages.

SUMMARY OF THE INVENTION

The new algorithm was derived by introducing the following new features to the range/Doppler and wave equation algorithms, based on taking advantage of features of the linear frequency modulation conventionally used for range signal modulation:
1. a range perturbation method of equalizing the range equation of all reflectors to allow RCMC to be performed without the use of an interpolator
2. a memory utilization scheme for handling large Doppler centroid changes,
3. small correction terms are used to maintain proper phase and spatial scale for satellite imaging geometries, and 4. compensation to keep the phase of the compressed image correct.

BRIEF DESCRIPTION OF THE DRAWINGS

The features of a specific embodiment of the best mode contemplated of carrying out the invention are illustrated in the drawings, in which.

DETAILED DESCRIPTION

A descriptive outline of the new algorithm is contained in this section. In following sections, a mathematical derivation of the new algorithm is given, and a simulation program is given which is used to demonstrate the accuracy of the new algorithm with high squint.

The new algorithm is based on the assumption that the range signal is linearly frequency modulated as is customarily the case for synthetic aperture radar (SAR) and analogous systems. The algorithm may be applied successfully to signals that are quasi-linear in their frequency modulation. Furthermore, if there is a different class of modulation used in the range dimension, then the range signals may be coherently demodulated and then remodulated with the required linear frequency modulation through the use of pre-processing steps. Thus, the assumption of linear frequency modulation does not limit the applicability of the new algorithm. Exploitation of properties of large time-bandwidth linear frequency modulation of the range signal sets the new algorithm apart from all others.

Figure 1:
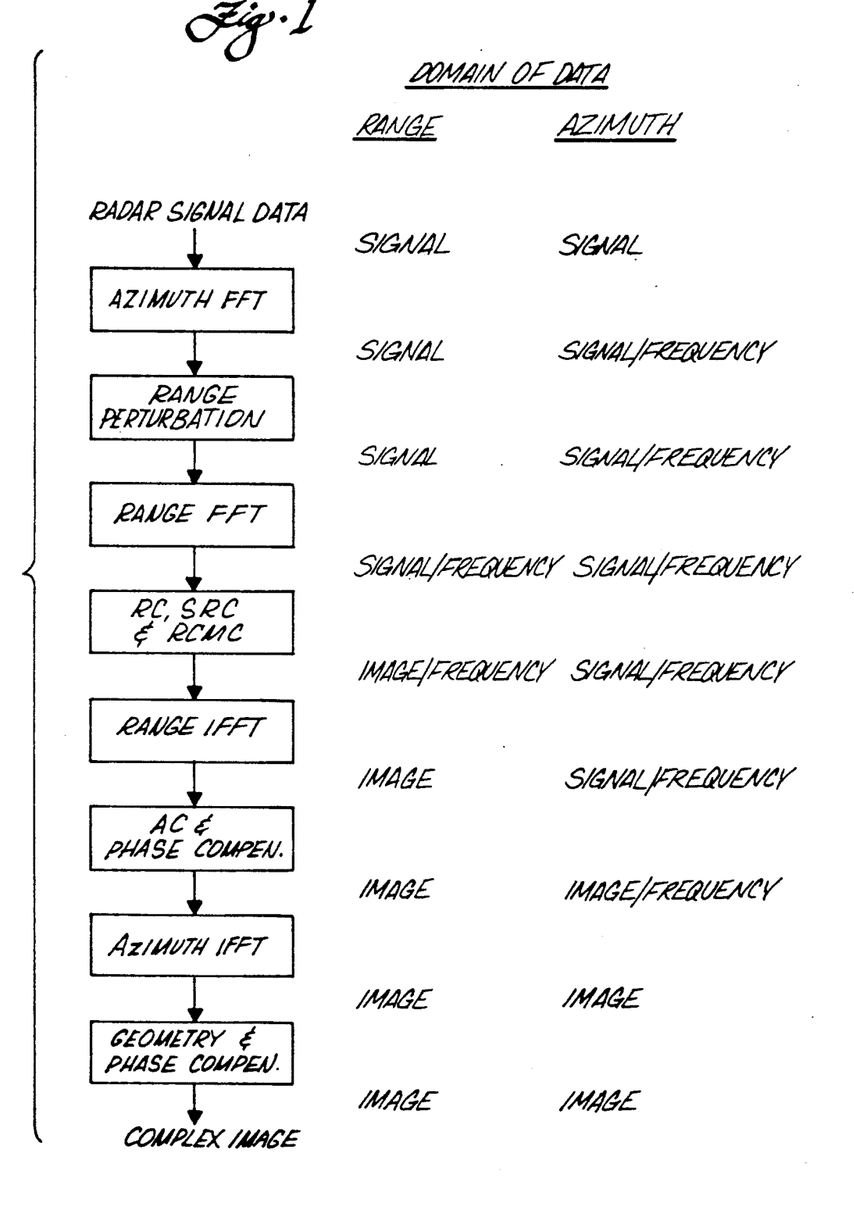
FIG. 1 is a schematic block diagram of the steps for practicing the invention.

The structure of the new algorithm is shown in FIG. 1. A list of acronyms used is set forth in Table 3. The steps in the algorithm are as follows:

Azimuth FFT

This step consists of taking the discrete Fourier transform of each column of the radar signal data array, i.e., in the azimuth direction. This transform is implemented by a Fast Fourier Transform or FFT, a procedure well-known to those versed in the art. The data are not in the range-signal, azimuth (Doppler)-frequency space.

Range Perturbation (RP)

This step is a multiplication by a near-linear-FM phase function to differentially shift the target energy in range by making a small range-dependent frequency adjustment to each target. At each Doppler frequency, the range frequency shift is chosen to make the target trajectory congruent with that of the target at a selected reference range cell. More specifically, the frequency shift has the effect of making the loci of the zero-range-frequency point of each target congruent to that of the reference target.

For simple SAR geometries, the RP phase function is linear FM. For more complicated geometries, as encountered in satellite SAR systems a small nonlinear FM component is added to the phase function, using a polynomial structure. The total excursion of the frequency of the RP function is ±0.15 Mhz which does not appreciably affect the available range bandwidth, which is typically on the order of 20 MHz or more.

Because the shift is a function of absolute rather than aliased Doppler frequency, this operation, and the next three operations in FIG. 1 must be done on the full Doppler frequency span of the azimuth matched filters in the current range subswath. This means that the main range processing int he next three steps may have to be done on more than one azimuth ambiguity. This affects efficiency and will be a factor in choosing the range subswath size.

Range FFT

This step consists of taking the discrete Fourier transform of each row of the radar signal data array, i.e., in the range direction. This transform is implemented by a Fast Fourier Transform or FFT, a procedure well-known to those versed in the art.

The data are now in the two-dimensional frequency plane. Owing to the RP operation, the require RCMC as well as the range focus matched phase functions are single valued in this domain, and may be implemented without interpolation or significant approximation. This feature is found in no other SAR processing algorithm.

RC & RCMC

The operations of range compression (RC) and range cell migration correction (RCMC) are implemented simultaneously be a single phase multiply in the two-dimensional frequency domain, where the phase value as applied at each sample depends upon range frequency and azimuth frequency.

Range compression or focusing in range consists of matching the phase modulation on the range variable. Most of this phase modulation comes from the range chirp which is usually a function of range frequency squared. However, owing to the imaging geometry, the effective range modulation includes Doppler frequency effects, whereby the effective range modulation (or RM rate) becomes a function of azimuth frequency as well as range frequency (see equations (3) to (5)). This dependence is included in the phase multiplication used to implement range compression and RCMC.

If the RP function is linear FM, the range chirp to be compressed has the same FM rate in each range cell, slightly adjusted from the original chirp FM rate. As a consequence of the RP function, there is a small shift in the chirp frequency envelope, which can be neglected in the processing as the shift is a small fraction ($<1\%$) of the total range bandwidth. In practice, the frequency modulation of the RP function can be slightly nonlinear. However, the nonlinear component is so small that RC is not affected, except for a phase change that is correct after azimuth compression.

The part of the phase function which implements RCMC is a range-direction phase ramp whose slope is Doppler dependent. It shifts all trajectories (the zero-range-frequency locus) by the same amount at each Doppler frequency, which is correct as the range perturbation has made all the target trajectories congruent.

Range IFFT

This step consists of taking the inverse discrete Fourier transform of each row of the data array, i.e., in the range direction. This transform is implemented by an Inverse Fast Fourier Transform or IFFT, a procedure well-known to those versed in the art.

The data are now in the range-image, azimuth-frequency space, with all range curvature correction having been accomplished. Data are now fully linearized in azimuth (columnar) order, ready for the remaining operations.

AC & Phase Compensation

After the range IFFT is applied, only the illuminated parts of the absolute Doppler spectrum are retained for the final compression steps. The retained frequencies can be adjusted every range cell if necessary.

The azimuth compression (AC) operation consists of multiplying each azimuth line by a near-quadratic phase function, in the same way as done in the R/D algorithm. At the same time, a phase compensation term is applied to correct for the phase distortion arising in the range perturbation stage. The compensation is a function of the local slope of the RP function, if the RP frequency ramp is nonlinear.

Note 1: As in the WE family of algorithms, a bulk AC can be done in the 2-dimensional frequency domain. However, it is better to apply the whole AC in the range-image frequency domain because a residual correction is needed anyway, and the 2-dimensional operations are done for more than one azimuth ambiguity. Doing the whole AC at this stage is mathematically equivalent, and has the simplicity of confining the azimuth phase calculation to one step in the processing.

Note 2: If weighting is to be applied or multiple looks are to be extracted, they are done between the AC phase multiply and the azimuth IFFT, in the same way as in the R/D algorithm. In the case of multiple looks, the IFFTs are shorter than the forward FFTs, and pre-detection interpolation, detection and look summation follow the IFFT operation.

Azimuth IFFT

This step consists of taking the inverse discrete Fourier transform of each column of the data array, i.e., in the azimuth direction. This transform is implemented by an Inverse Fast Fourier Transform or IFFT, a procedure well-known to those versed in the art.

The data are now focused in the range-image, azimuth-image space. The resulting data block is a single frame of the focused complex image.

Geometry & Phase Compensation

If the Doppler FM rate varies with azimuth time, then a time-domain post-compression phase and registration correction is needed in addition to the compensation discussed above. This step consists of a phase multiply and an interpolation operation to make the image phase and registration continuous over the boundary between azimuth processing blocks.

The geometry and phase compensation is proportional to the azimuth FM rate error times the processed Doppler center at each azimuth point. Either or both of these steps can be omitted if the correction is small compared to the image quality requirements of the application.

Details of the New SAR Processing Method

In this section, the concept of the range perturbation function is outlined, a mathematical expression of its form is given, and computer code which gives an example of its implementation is given.

Figure 5:
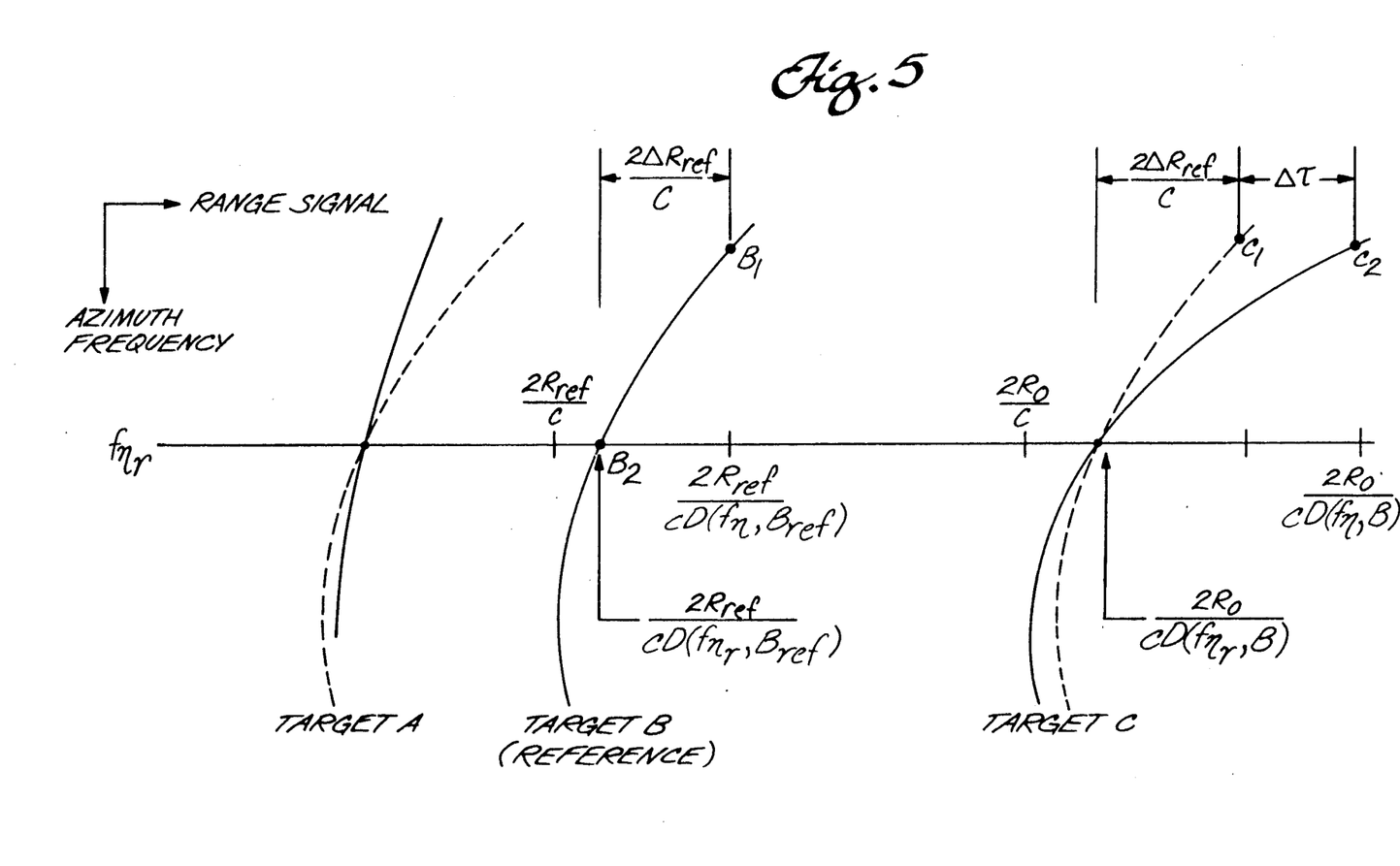
FIG. 5 is a diagram of trajectories before application of RP function.

The need for differential RCMC correction is illustrated in FIG. 5. In this figure, three targets are shown in solid lines at near range (target A), mid-range (target B), and far range (target C), in range-signal, azimuth-frequency space (i.e., after the azimuth FFT) Because of the geometry of the SAR sensor in relation to the targets, it is commonly found that the shape of the trajectories of targets A, B and C in range-signal, azimuth-frequency space are not the same.

In order for RCMC to be performed accurately in range-frequency, azimuth-frequency space, all trajectories must have the same shape in the range-signal, azimuth-frequency space. In other words, the trajectories of targets A and C (and all others away from the reference range of target B), must be adjusted so that their shape is the same as that of target B. In this case, target B is said to at the reference range. The required adjustment is shown by the dotted lines in FIG. 5.

It is noted that at each range position or time $\tau$ and at each azimuth frequency $f_\eta$, the required adjustment is shown as $\Delta\tau$. If $\Delta\tau$ varies linearly with range time $\tau$ at each azimuth frequency $f_{\eta 2}$ (the azimuth FM rate parameter B is range invariant), and if the range encoding is linear FM, the required adjustment can be elegantly done with the simple multiplication with a linear FM perturbation signal. The slope of the linear FM perturbation signal varies with azimuth frequency, because the required adjustment $\Delta\tau$ is a function of azimuth frequency.

Figure 6:
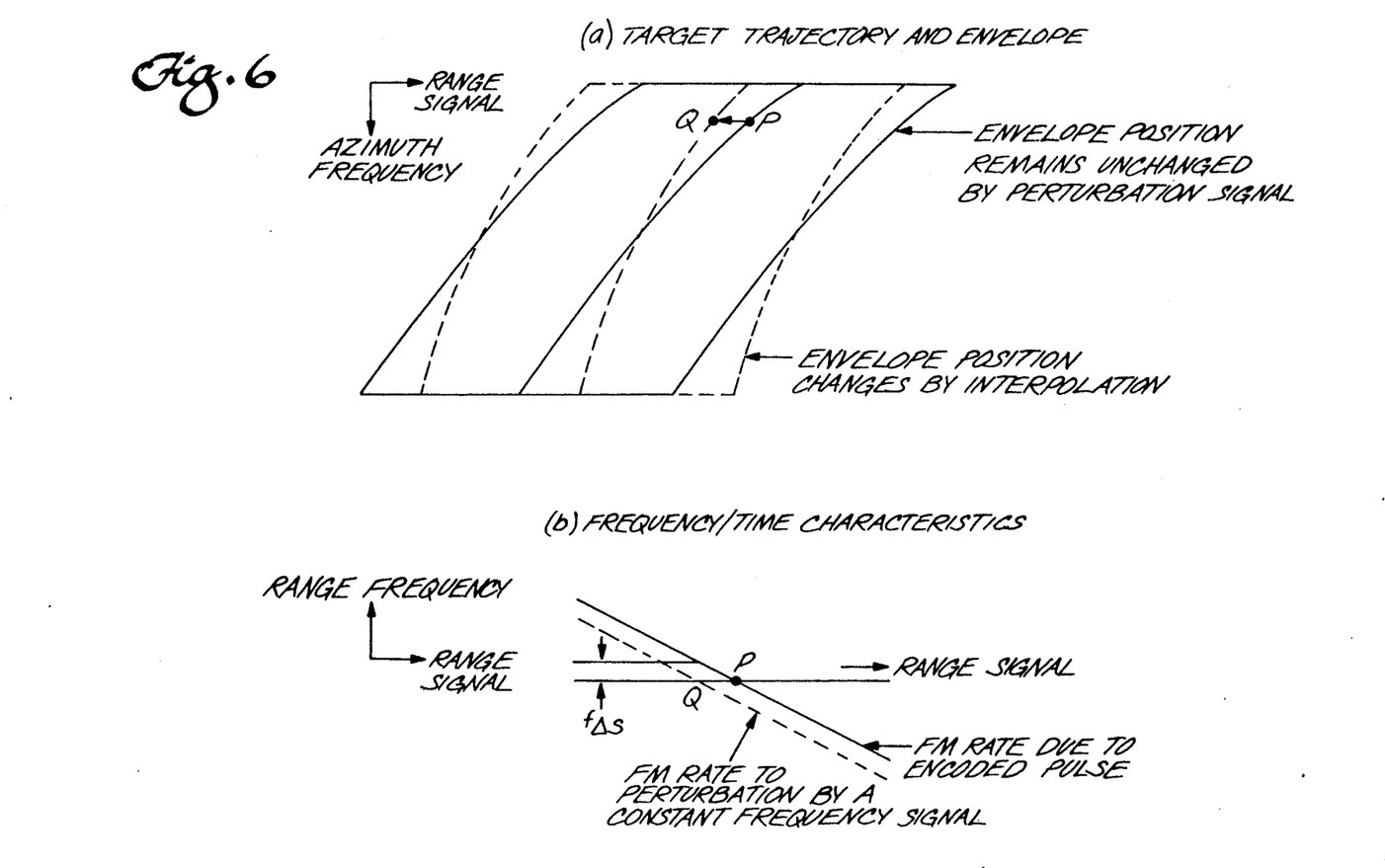
FIG. 6 is a diagram illustrating the concept of RCMC in the new algorithm.

The principle of the perturbation function is illustrated in FIG. 6. In part (a) of the figure, the envelope of a single target is shown in solid lines in range-signal azimuth-frequency space. In addition to the envelope, the locus of a particular range frequency is also shown in a solid line, on which the point P is shown at a certain azimuth frequency. If the range signal is at baseband, the solid line containing the point P can represent the locus of zero range frequency, which is assumed in the following discussion.

The dotted lines in part (a) of FIG. 6 show where the envelope of the target energy should lie after the adjustment described above. Specifically, the range-time shift of point P to point Q represents the shift $\Delta\tau$ discussed above.

One way to implement the shift PQ is to use a range-signal-domain interpolator. However, this interpolation operation would introduce errors, which we wish to avoid in the subject invention. An essentially equivalent way of achieving the shift is to adjust the range frequency of the target so that the locus of zero-range-frequency lies along the dotted line containing the point Q.

This apparent shift is illustrated in part (b) of FIG. 6. Here, the range frequency is adjusted by $-f_{\Delta s}$ by multiplying the signal by $\exp(-j2\pi f_{\Delta s}\tau)$, which has the effect of adjusting the range time of the signal by the amount $\Delta\tau = PQ$, where $\Delta\tau$ is $-f_{\Delta s}$ divided by the range chirp FM rate. Note that in part (a) of FIG. 6, the envelope does not actually move, only the locus of a particular range frequency point moves, but this has the desired effect of moving the range energy after compression.

The shifting operation illustrated in part (b) of FIG. 6 assumes that the range pulse have linear FM coding. If the pulse coding is not linear FM, it can be made linear by a pre-compression step. This is achieved before the RP operation by a technique directly analogous to conventional range compression, namely by a range-frequency domain array multiply which turns the range encoding into a quadratic phase function. In a similar fashion, if the data is already range compressed, it must be ranged expanded with a linear FM encoding prior to the application of the RP function.

Figure 7:
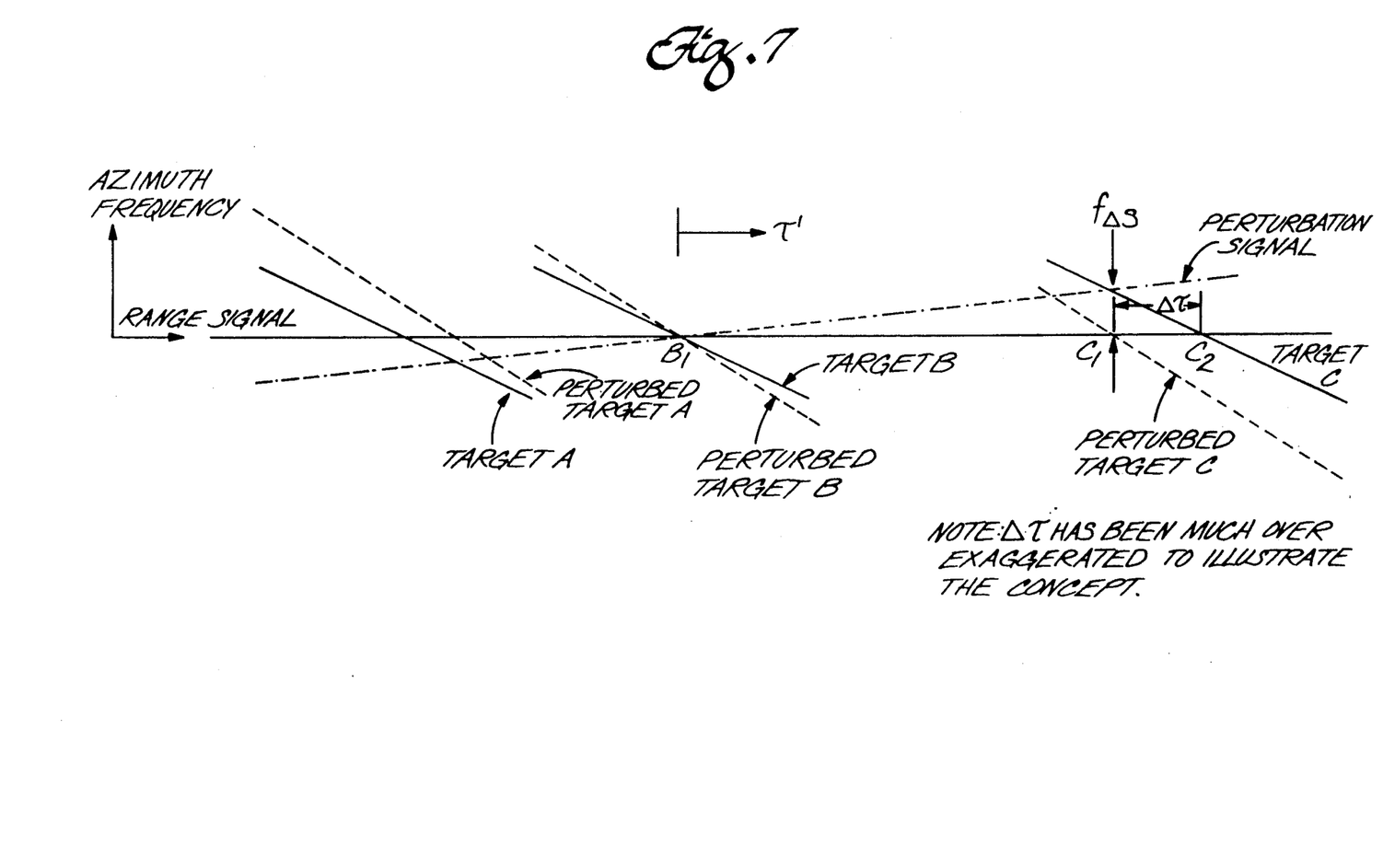
FIG. 7 is a diagram illustrating the application of range perturbation over the whole range swath.

How the range perturbation is applied over the whole range swath is illustrated in FIG. 7. In this figure, the three targets A, B and C of FIG. 5 are shown, selected at a single azimuth frequency where points $C_1$ and $C_2$ lie. As the required shift $\Delta\tau$ varies with range time the frequency $-f_{\Delta s}$ must be different at different range times. This is achieved by making the range perturbation function a linear FM signal for the case where the required shift $\Delta\tau$ varies linearly with range time, as shown in FIG. 7. In the case where the required shift $\Delta\tau$ has a nonlinear dependence on range time, a modified range perturbation function can be used, as discussed below.

The fact that the range perturbation signal is linear FM or approximately linear FM rather than a constant frequency means that the range FM rate of the target is changed by a small amount. However, this is easily adjusted during the range processing (in the RC step).

One of the mathematical ways to describe the new SAR processing algorithm is given below. Refer to the symbols defined in Table 1.

The base band converted and uncompressed radar signal $S_0(\tau,\eta)$ assuming a linear FM radar pulse, received from a point target can be expressed as:

$$S_0(\tau,\eta) = A_0 p\left[\tau - \frac{2R(\eta)}{c}\right]\omega\left(\eta - \eta_c\right)\exp\left[\frac{-j4\pi f_0 R(\eta)}{c}\right]\exp\left(-j\pi K_r\left[\tau - \frac{2R(\eta)}{c}\right]^2\right) \quad (1)$$

The standard hyperbolic approximation of the instantaneous slant range $R(\eta)$ is given by:

$$R(\eta) = \sqrt{R_0^2 + B\eta^2} \quad (2)$$

where B is called the azimuth FM rate parameter from here on. This parameter can be range variant.

After performing an azimuth FFT directly on the raw range uncompressed data $S_0(\tau, \eta)$, the range FM rate $K_m$ becomes:

$$K_m = \frac{K_r}{1 + K_r Z} \quad (3)$$

where Z is given by:

$$Z = \frac{cR_0 f_\eta^2}{2Bf_0^3 D^3(f_\eta, B)} \quad (4)$$

and D is given by:

$$D(f_\eta, B) = \sqrt{1 - \frac{c^2 f_\eta^2}{4Bf_0^2}} \quad (5)$$

The factor $D(f_\eta, B)$ is approximately the cosine of the squint angle, which is approximately the angle subtained by the zero Doppler axis and the line of sight to the Doppler centroid of the target.

The modified range FM rate $K_m$ can be viewed as the effective FM rate of the radar pulse, arising from the non-orthogonal imaging geometry, as seen in the range-signal, azimuth-frequency domain.

The concept of the perturbation signal has been discussed above. The perturbation signal shifts the trajectory of Target C, represented by a solid line in FIG. 5, to the dashed line position which is congruent to the trajectory of the reference Target B. An alternative interpretation is that the range frequency along any point of the dashed line is shifted to zero Hz by the application of the perturbation function.

To find the perturbation frequency at point $C_1$, the time difference $\Delta\tau(\tau, f_\eta)$ between points $C_1$ and $C_2$ as a function of range time $\tau$ has to be found first and this is the differential RCMC $\Delta\tau(\tau, f_\eta)$.

From the geometry of the figure, it can be shown that:

$$\Delta\tau(\tau,f_\eta) = -\tau'\left[\frac{D(f_{\eta\tau},B)}{D(f_\eta,B)} - 1\right] - \frac{2R_{ref}}{c}\left[\frac{D(f_{\eta\tau},B)}{D(f_{\eta\tau},B_{ref})D(f_\eta,B)} - \frac{1}{D(f_\eta,B_{ref})}\right], \quad (6)$$

where the range time variables $\tau$ and $\tau'$ are related by $$\tau' = \tau - \frac{2R_{ref}}{cD(f_\eta,B_{ref})}. \quad (7)$$

The fractional term in the above equation is the time at which there is no differential RCMC to be applied, and is represented by point $B_1$ in FIG. 5.

The perturbation signal $\Delta S(\tau, f_\eta)$ is then given by:

$$\Delta S(\tau,f_\eta) = \exp\left(j2\pi K_m \int_0^{\tau'} \Delta\tau(\tau,f_\eta)d\tau'\right) \quad (8)$$

The function $\Delta\tau(\tau, f_\eta)$ can be represented by a polynomial in $\tau$, and the coefficients of the polynomial can be obtained by a least squares method. In this way, an analytic form of the integral can be obtained.

In practice, B has a small variation with range time $\tau$. For simplicity the derivation below will be given for B independent of $\tau$. It is straight forward to extend the solution to the case where B varies with $\tau$, as will be mentioned at the end.

The perturbation signal $\Delta S(\tau, f_\eta)$ for a range invariant B, equal to $B_{ref}$, is given by:

$$\Delta S(\tau,f_\eta) = \exp\left(-j\pi K_m\left[\frac{D(f_{\eta\tau},B_{ref})}{D(f_\eta,B_{ref})} - 1\right](\tau')^2\right) \quad (9)$$

The azimuth FFTed signal is multiplied by the perturbation signal. A range FFT is then performed on the perturbed signal and the result is:

$$S_p(f_\tau, f_\eta) = A_1 P(f_\tau) W(f_\eta - f_{\eta c}) \quad (10)$$

$$\exp\left(-\frac{j4\pi R_0 f_0 D(f_\eta, B)}{c}\right)$$

$$\exp\left(j\frac{\pi D(f_\eta, B_{ref})}{K_m D(f_{\eta\tau}, B_{ref})} f_\tau^2\right)$$

$$\exp\left(-j\frac{4\pi}{c} \frac{R_0}{D(f_{\eta\tau}, B_{ref})} f_\tau\right)$$

$$\exp\left(-j\frac{4\pi}{c}\left[\frac{1}{D(f_\eta, B_{ref})} - \frac{1}{D(f_{\eta\tau}, B_{ref})}\right] R_{ref} f_\tau\right)$$

$$\exp\left(-j\frac{4\pi K_m (R_0 - R_{ref})^2}{c^2 D(f_\eta, B_{ref})}\left[\frac{1}{D(f_\eta, B_{ref})} - \frac{1}{D(f_{\eta\tau}, B_{ref})}\right]\right)$$

The constant $A_1$ is due to the target signal amplitude and has a phase angle equal to multiples of $\pi/4$ induced by the range and azimuth FFTs.

The five exponential terms exp{.} in Equation 10 can be interpreted as follows:

The first exponential term contains azimuth modulation and is range dependent; therefore it will be dealt with in azimuth processing in the range image azimuth-frequency domain. Note that the correct value of the FM rate parameter B, instead of $B_{ref}$, is kept for azimuth processing.

The second exponential represents range modulation after perturbing the data with the perturbation signal.

The third exponential term is the phase due to the target position at $R_0/D(f_{\eta\tau}, B_{ref})$. This term is independent of azimuth frequency.

The fourth exponential term represents the bulk RCMC which is range invariant as required. This corresponds to the RCMC correction needed for target B of FIG. 5.

The fifth exponential term contains a residual phase which is a function of range, and therefore will be corrected in azimuth processing in the range-image azimuth-frequency domain.

After the application of the range perturbation and the range FFT, the remaining processing steps are:

1. Apply RC and RCMC (step 4 in FIG. 1) by multiplying $S_p(f_{96}, f_\eta)$ by the complex conjugates of the second and fourth exponential terms in Equation 10.
2. Perform a range IFFT.
3. Apply AC and Phase Compensation (step 4 in FIG. 1) by multiplying the result from the above step by the complex conjugates of the first and fifth exponential terms in Equation 10.
4. Perform an azimuth IFFT.

The final result is a compressed target positioned at range time $R_0/D(f_{\eta\tau}, B_{ref})$ (due to the third exponential term in Equation 10) and azimuth time $\eta_c$.

Table 1 sets forth the definition of terms in the forgoing equations.

For the case of a range variant FM rate parameter, the perturbation signal in Equation 8 can be approximated by a polynomial (higher than quadratic) in range time and then assumed to be locally linear in computing the residual phase (fifth exponential term). The case of the range variant FM rate parameter, B, is covered in the source code of Table 2, where one of the possible implementations of the algorithm is given.

Memory Utilization Scheme

Figure 2:
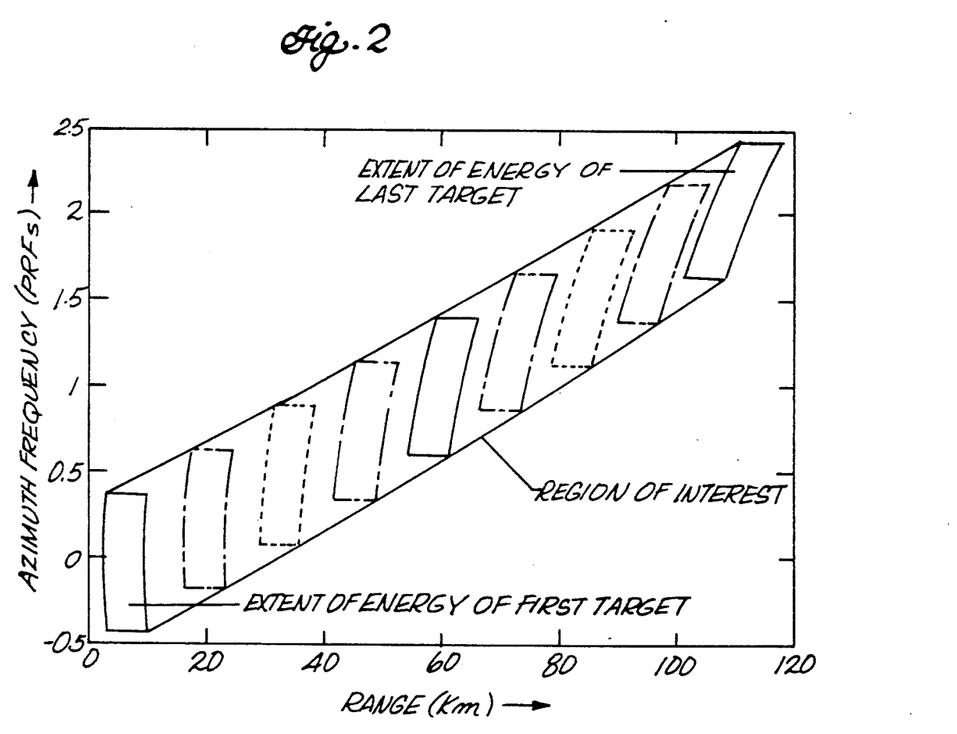
FIG. 2 is a diagram of memory allocation for RP operation.

The memory utilization scheme consists of a way of assigning memory in azimuth frequency, range signal space and in azimuth frequency, range frequency space so that the operations of RP, Range FFT, RC, RCMC, and Range IFFT can be carried out with maximum efficiency, in the face of large changes in the target Doppler centroid with resect to range. The steps in the memory utilization scheme are as follows:

1. After the azimuth FFT, lay out an area of memory occupied by all the target trajectories of interest in unaliased azimuth frequency units, as shown in FIG. 2. Note that the targets are range expanded, and cover about 2.8 azimuth ambiguities over a 100 Km range swath, which is the maximum azimuth extent that is typically found in C-band satellite SARs. The area covered by all the target trajectories of interest is outlined by the border which is approximately parallelogram shaped in FIG. 2 (see region of interest).

2. Apply the range perturbation function to the area of interest of FIG. 2. Note that each trajectory covers about 0.80 of a PRF in azimuth frequency, but because of the Doppler centroid slope and the chirp length, the height of the region of interest is close to one PRF. Data outside the region of interest can be ignored for this operation.

3. For the next operation, choose a range FFT size which maximizes the arithmetic efficiency of the range processing operations.

Figure 3:
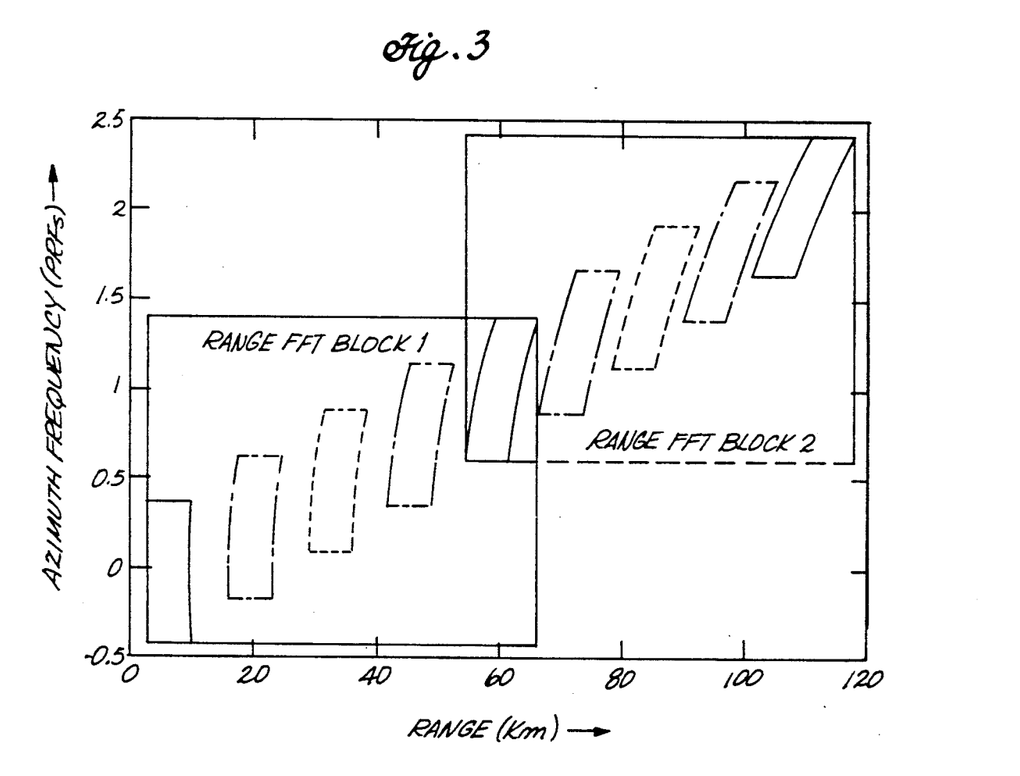
FIG. 3 is a diagram of memory allocation for range FFT and IFFT operations.

The range FFT size can be as large as the whole range swath, but this will create inefficient RC, RCMC and range IFFT processing, because of operating on more azimuth ambiguities than necessary. On the other hand, the range FFT size can be made as small as the convolution throwaway region, which is the sum of the range chirp length and the maximum range migration. However, at this short size, the arithmetic efficiency suffers because of the large size of the throwaway region relative to the FFT length. At some FFT size in between these two extremes the minimum arithmetic rate will be realized. This optimum size depends upon the chirp length, the Doppler slope and other geometrical considerations. It is easy to work out the optimum range FFT size given the specific radar geometry. In FIG. 3, 2 range FFT blocks are shown by way of example.

4. Apply the range FFTs within the blocks shown in FIG. 3. Note that the blocks are overlapped in range by the throwaway region described in the previous point. In a given block, once FFTs are done which cover one azimuth ambiguity (one PRF), the results for the remaining range lines in the block can be simply filled in by replication of the corresponding azimuth-ambiguous range spectra.

5. Apply the RC, RCMC function within each block in FIG. 3. Every point in each block must be processed because of the dispersal property of the range FFT.

6. Apply the range IFFT to each range line in each block. Again, every range line in each block must be processed in this operation.

7. At this point, the targets are range compressed and range cell migration corrected, and have the form shown in FIG. 4. Note that the range block throwaway regions have been discarded, and the area of interest (of valid data) has reverted to the parallelogram shape shown.

Figure 4:
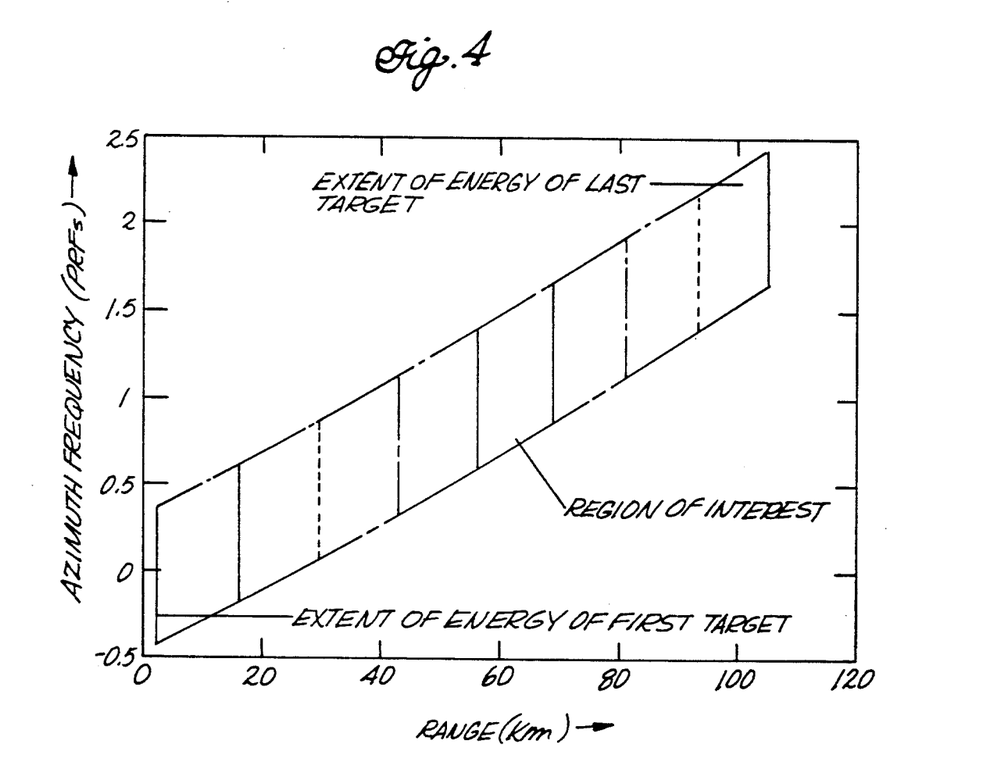
FIG. 4 is a diagram of memory allocation after range processing.

The data can then be put back in its rectangular form, using the structure of the azimuth ambiguities. Note that the use of the parallelogram shaped regions (with absolute azimuth frequency) rather than rectangular shaped regions (with aliased azimuth frequency) in the memory allocation scheme is not necessary—it is done in this presentation for clarity purposes, so that the meaning of absolute azimuth frequency is apparent in the figures.

The AC and subsequent operations are then applied to this area of interest, to complete the processing steps.

TABLE 1

Symbols used in the mathematical description of the new algorithm

| | |
|---|---|
| $A_0$ = | signal amplitude |
| $A_1$ = | signal amplitude and phase due to FFTs |
| $B$ = | azimuth FM rate parameter |
| $B_{ref}$ = | azimuth FM rate parameter of reference target (FIG. 5) |
| $c$ = | speed of light |
| $D(f\eta, B)$ = | approximately cosine factor of squint angle |
| $f_0$ = | carrier frequency |
| $f_\eta$ = | azimuth frequency |
| $f_{\eta c}$ = | Doppler centroid frequency |
| $f_{\eta r}$ = | reference zaimuth frequency at which there is no RCMC |
| $f_\tau$ = | range frequency |
| $j^2$ = | $-1$ |
| $K_m$ = | modified range FM rate due to squint |
| $K_r$ = | radar pulse FM rate |
| $p(\tau)$ = | range uncompressed pulse envelope |
| $P(f_\tau)$ = | envelope of range frequency spectrum |
| $R_0$ = | slant range of closest approach of target |
| $R_{ref}$ = | slant range of closest approach of reference target (FIG. 5) |
| $R(\eta)$ = | target instantaneous slant range |
| $S_p(f_\tau,F_\eta)$ = | range FFT of perturbed signal |
| $w(\eta)$ = | antenna azimuth beam pattern |
| $W(f_\eta)$ = | envelope of azimuth frequency spectrum |
| $Z$ = | azimuth frequency coupling into range FM rate |
| $\eta$ = | azimuth time |
| $\eta_c$ = | Doppler centroid in azimuth time units |
| $\tau$ = | time in range signal space |
| $\tau'$ = | time in range signal space referenced to that at which perturbation signal is unity |
| $\Delta\tau(\tau, f_\eta)$ = | differential RCMC in range signal (time) space |
| $\Delta S(\tau, f_\eta)$ = | perturbation signal |

TABLE 2

% NEW SAR ALGORITHM SIMULATION  raney 5.m
%
%
% Frank Wong, Ian Cumming  March 1, 1991
%
% Test Target, full RCMC, range varying B
format compact, clear, !rm m.prn, !rm plot.met, pack
% Specify input parameters.

| | |
|---|---|
| n_rg = 256; | % Number of range samples |
| n_az = 512; | % Number of azimuth samples |
| c = 3.0e + 08; | % Speed of light, m/s |
| f0 = 6.0e + 09; | % Radar frequency, Hz |
| Fr = 20.0e + 06; | % Range sampling rate, Hz |
| Tr = 8.0e − 06; | % Pulse width, s |
| os_rg = 1.1; | % Range oversampling ratio |
| os_az = 1.1; | % Azimuth oversampling ratio |

TABLE 2-continued

| | |
|---|---|
| eta_c = −22.0; | % Scene centre time, s |
| R_ref = 1.0e + 06; | % Reference slant range, m |
| R_0 = 0.98e + 06; | % Target slant range of closest approach, m |
| B_ref = 50.0e + 06; | % B at reference, I2/B2 |
| B_sl = −5.0; | % Slope in B, (m2/s2)/m |

% Doppler centroid in azimuth frequency domain lambda = c/f0;
B_tar = B_ref + B_s * (R_0 − R_ref);
R_etac = sqrt (R_0^2 + B_tar * eta_c^2);
approx_Ka = 2.0 * B_tar/(lambda * R_etac);
Kr = Fr/(Tr * os_rg); % Range FM rate
Fa = sqrt (n_az * approx_Ka * os_az); % PRF
fnc = −eta_c * approx_Xa;
D_fnc = sqrt (1.0 − lambda$^{-2}$ * fnc$^{-2}$/(4.0 * B_tar));
M_amb = floor (fnc/Fa); % Ambiguity number % Slant range distance and azimuth time of first pixel R_fp = R_0/D_fnc − 0.5 * n_rg * (c/(2.0 * Fr));
eta_start = eat_c − 0.5 * n_az/Fa;

% Raw radar data s = zeros (n_az, n_rg) + j = zeros (n_az, n_rg); % Zero pad signal space
eta = (eta_start:1.0/Fa:eta_start + (n_az − 1)/Fa)'; % Azimuth time
tau = (2 * R_fg/c:1.0/Fr:2.0 * R_fp/c + (n_rg − 1)/Fr);
% Range time
R_eta = sqrt (R_0$^{-2}$ + B_tar * eta.$^{-2}$);
mask = sign (max (0, Tr 2 − ...
abs (ones (n_az, 1) * tau − 2 * R_eta * ones (1, n_rg)/c)));
phi_0 = exp (− 4 * pi * j * f0 * R_eta/c);
s (1:n_az, 1:n_rg) = (phi_0 * ones (1,n_rg)) .* mask .* ...
exp (− j * pi * Kr * (ones(n_az, 1) * tau − 2 * R_eta * ones (1, n_rg)/c).$^{-2}$);
keyboard, clear mask, pack
s = fft(s); % Azimuth FFT % Range processing Fa_half = Fa/2.0;
fn = (M_amb * Fa:Fa/n_az:M_amb * Fa + (n_az − 1) *Fa/n_az)';
fn = fn − fix((fn− fnc)/Fa_half) * Fa;
D_fn = sqrt(1.0 − lambda$^{-2}$ * fn.$^{-2}$/(4.0 * B_ref));
Z = d * R_ref * (fn.$^{-2}$)./(2.0 *B_ref * f0$^{-3}$ * D_fn. $^{-3}$);
Km = Kr./(1 + Kr * Z); % Combined FM rate % Perturbation signal tau_prime = ones(n_az, 1) * tau − ...
2.0 * (R_ref./(c * D_fn)) * ones (1, n_rg); % Range time matrix
ifit2 = 1 + fix (n_rg/3); ifit3 = 1 + 2 * fix (n_rg/3);
x_ele = [tau_prime(n_az/2.1), tau_prime(n_az/2,ifit2), ...
tau_prime(n_az/2,ifit3), tau_prime(n_az/2, n_rg)];
B_array = b_ref + B_sl * c * x_ele/2.0;
coeff_store = zeros(n_az, 2); taup_array = zeros(n_az, n_rg);
for loop = i;n_az
DfncB = sqrt(1.0 − lambda$^{-2}$ * fnc$^{-2}$/(4.0 * B_array));
DfnB = sqrt(1.0 − lambda$^{-2}$ * fn(loop)$^{-2}$/(4.0 * B_array));
DfnBref = sqrt(1.0 − lambda $^{-2}$ * fn(loop)$^{-2}$/(4.0 * B_ref));
x_ele = [tau_prime(loop,1), tau_prime(loop,ifit2), ...
tau_prime(loop,idif3), tau_prime(loop,n_rg)];
y_ele = −x_ele .* (DfncB./DfnB − 1.0); − ...
(2.0 * R_ref/c) * (DfncB./(D_fnmc * DfnB) − 1.0/DfnBref);
coeff = polyfit(x_ele, y_ele, 1);
taup_array(loop,:) = coeff(1) * tau_prime(loop,:).$^{-2}$/2.0 + ...
coeff(2) * tau_prime(loop,:) − ;
coeff_store(loop, :) = coeff;
end
A1 = − pi * Km .* coeff_store(:,1);
A2 = −2.0 * pi * Km .* coeff_store(:,2);
A = − pi * Km .* coeff_store(:,1);
A2byA1 = 2.0 * coeff_store(:,2)./coeff_store(:,1);
plot (A2byA1)

% Perturb azimuth FFTed signal s = s .* exp (j * 2.0 * pi * (Km * ones(1,n_rg)) .* taup_array);
keyboard, clear taup_array tau_prime, pack % Range FFT s = conj(s'); s = fft(s); s = conj(s');

% Range compression and RCMC

Fr_half = Fr/2.0;
f_tau = (0.0: Fr/n_rg; Fr − Fr/n_rg);
f_tau = f_tau − fix(f_tau/Fr_half) * Fr;
theta = (pi$^{-2}$./(pi * Km + A)) * F_tau.$^{-2}$− ...
4.0 * pi * R_ref * (A ./((pi * Km + A) .* D_fnc)) * f_tau/c;
s(1:n_az, 1:n_rg) = s(1:n_az, 1:n_rg) .* exp(−j * theta(1:n_az, 1:n_rg));

TABLE 2-continued

```
clear theta, pack
% Range IFFT
s = conj (s'); s = ifft(s); s = conj(s');
k2 = 1 + fix(abs(rem(fnc,Fa))/Fa * n_az);
pbw = abs(approx_Ka*(eta(1) - eta(n_az)));
n_pbw = fix (0.4 * pbw * n_az/Fa);
k1 = k2 - n_pbw;
if (k1 < 1) k1 = n_az + k1; end
k3 = k2 + n_pbw;
if (k3 > n_az) k3 = k3 - n_az ; end
plot (1:n_rg, 20.0 * log10(abs(s(k1, ;))), '—', . . .
 1:n_rg, 20.0 * log10(abs(k2,:))), '— —', . . .
 1:n_rg, 20.0 * log10(abs(k3,:))), ':')
title ('Range Compressed and RCMCed Data, Test Target')
xlabel ('Range Time (samples)')
ylabel ('Magnitude (dB)')
keyboard
contour(abs(s))
title ('Contour of Range Compressed and RCMCed Data,
Test Target')
xlabel ('Range Time (samples)')
ylabel ('Azimuth frequency (samples)')
keyboard
clear R_eta Z eta f_tau, pack
% Azimuth compression and residual phase correction
r_0p = c * tau * D_fnc/2.0;
D_fnp = sqrt(1.0 - lambda^-2 * fn.^-2/(4.0 * B.tar));
phi = - 2.0 * pi * f0 * D_fnc * D_fnp * tau;
phi = phi - (( (4.0./(c^-2 * D_fn.^-2)) .* . . .
 (pi * Km .* A./(pi * Km + A)) ) * ones(1,n_rg)) .* . . .
 (( ones(n_az,1) * R_Op - . . .
 (R_ref - (c/4.0) * D_fn .* A2byA1) * ones(1,n_rg) ).^-2);
phi = phi + (2.0 * pi * eta_c * fn + A2 .* A2byA1) *
 ones(1,n_rg);
s(1:n_az, 1:n_rg) = s(1:n_az, 1:n_rg). * exp(-j *
phi(1:n_az, 1:n_rg));
% Azimuth IFFT
s = ifft(s);
[y,index_column] = max(s);
[y,index_row] = max(y);
index = index_column(index_row);
plot (20.0 * log10(abs(s(index,:))))
text(0.60,0.8,sprintf('Max at azimuth cell%4.0f',index), 'sc')
title ('Range Impulse Response of Test Target')
xlabel ('Range Time (samples)')
ylabel ('Magnitude (dB)')
% meta plot
keyboard
plot (20.0 * log10 (abs (s(:, index_row))))
title ('Azimuth Impulse Response of Test Target')
xlabel ('Azimuth Time (samples)')
ylabel ('Magnitude (dB)')
text(0.60,0.8,sprintf('Max at range cell%4.0f',index_row),'sc')
% meta plot
clear phi
```

TABLE 3

List of Acronyms

| | |
|---|---|
| AC | Azimuth Compression |
| DFT | Discrete Fourier Transform |
| FFT | Fast Fourier Transform |
| FM | Frequency Modulation |
| IFFT | Inverse Fast Fourier Transform |
| PRF | Pulse Repetition Frequency |
| PRI | Pulse Repetition Interval |
| RAR | Real Aperture Radar |
| RC | Range Compression |
| RCMC | Range Cell Migration Correction |
| R/D | Range/Doppler |
| RP | Range Perturbation |
| SAR | Synthetic Aperture Radar |
| WE | Wave Equation |

What is claimed is:

1. A digital signal processing method for focusing samples of two-dimensional signals reflected form targets in a synthetic aperture radar or analogous system, the samples representing azimuth lines (columns) and range lines (rows), the method comprising the steps of:

(a) transforming the azimuth lines from the signal domain to the frequency domain;

(b) rotating the phase of each sample in the range-signal, azimuth-frequency domain to make the zero-range-frequency loci of each target congruent with each other target;

(c) transforming the range lines form the signal domain to the frequency domain;

(d) rotating the phase of each sample in the range-frequency, azimuth-frequency domain so that after step (e) the range energy is focused, and aligned in the azimuth direction;

(e) transforming the range lines from the frequency domain to the image domain;

(f) rotating the phase of each sample in the range-image, azimuth-frequency domain, so that after step (g) the azimuth energy is focused; and (g) transforming the azimuth lines from the frequency domain to the image domain.

2. The signal processing method of claim 1, additionally comprising the step of generating parameters for the recited steps.

3. The signal processing method of claim 2, additionally comprising the step of utilizing memory space to allow efficient range processing in the range-frequency, azimuth-frequency domain in the case where the received signal data extends over multiple azimuth ambiguities.

4. The signal processing method of claim 3, additionally comprising the step of using adjustments to the phase rotation terms to maintain image focus, phase, and spatial scale for large aperture, squinted satellite SARs and analogous systems.

5. The signal processing method of claim 4, in which step (d) includes the step of compensating for phase changes induced by step (f).

6. The signal processing method of claim 5, in which step (g) includes the step of compensating for phase and registration errors occurring when the Doppler parameters are updated with respect to azimuth time.

7. The signal processing method of claim 6, in which the reflected signals are frequency modulated at a non-linear rate, the method additionally comprising the step of matching the frequency modulation rate of the samples prior to step (b).

8. The signal processing method of claim 1, additionally comprising the step of utilizing memory space to allow efficient range processing in the range-frequency, azimuth-frequency domain in the case where the received signal data extends over multiple azimuth ambiguities.

9. The signal processing method of claim 1, additionally comprising the step of using adjustments to the phase rotation terms to maintain image focus, phase, and spatial scale for large aperture, squinted satellite SARs and analogous systems.

10. The signal processing method of claim 1, in which step (d) includes the step of compensating for phase changes induced by step (f).

11. The signal processing method of claim 1, in which step (g) includes the step of compensating for phase and registration errors occurring when the Doppler parameters are updated with respect to azimuth time.

12. The signal processing method of claim 1, in which the reflected signals are frequency modulated at a nonlinear rate, the method additionally comprising the step of matching the frequency modulation rate of the samples prior to step (b).

* * * * *